United States Patent
Chan et al.

(10) Patent No.: US 10,044,628 B2
(45) Date of Patent: Aug. 7, 2018

(54) METHODS AND SYSTEMS FOR RECEIVING AND TRANSMITTING PACKETS BASED ON PRIORITY LEVELS

(71) Applicant: Pismo Labs Technology Limited, Hong Kong (HK)

(72) Inventors: Alex Wing Hong Chan, Hong Kong (HK); Ho Ming Chan, Hong Kong (HK); Patrick Ho Wai Sung, Hong Kong (HK)

(73) Assignee: PISMO LABS TECHNOLOGY LIMITED, Hong Kong (HK)

( * ) Notice: Subject to any disclaimer, the term of this patent is extended or adjusted under 35 U.S.C. 154(b) by 173 days.

(21) Appl. No.: 15/181,407

(22) Filed: Jun. 13, 2016

(65) Prior Publication Data
US 2017/0359268 A1    Dec. 14, 2017

(51) Int. Cl.
*H04L 12/28* (2006.01)
*H04L 12/56* (2006.01)
(Continued)

(52) U.S. Cl.
CPC ........... *H04L 47/6275* (2013.01); *H04L 1/08* (2013.01); *H04L 45/741* (2013.01); *H04L 47/34* (2013.01);
(Continued)

(58) Field of Classification Search
CPC . H04L 47/6275; H04L 45/741; H04L 47/627; H04L 1/08; H04L 47/34; H04L 2212/00
(Continued)

(56) References Cited

U.S. PATENT DOCUMENTS 7,808,983 B2   10/2010  Joly
8,625,427 B1 *  1/2014  Terry .......................... 370/235
(Continued)

FOREIGN PATENT DOCUMENTS

CN   1383656 A   12/2002
CN   1969509 A    5/2007
(Continued)

OTHER PUBLICATIONS

English language Abstract of CN 1969509 A (May 23, 2007).
(Continued)

*Primary Examiner* — Chuong T Ho
(74) *Attorney, Agent, or Firm* — Hershkovitz & Associates, PLLC; Abe Hershkovitz

(57) ABSTRACT

The present invention discloses methods and systems for transmitting and receiving packets through a plurality of logical connections based on priority levels. When an encapsulating packets is received from a second network device via a logical network connection, priority level of a packet encapsulated in the encapsulating packet is determined, and the encapsulating packet is stored in a queue or transmitted to a host based on GSEQ, PSEQ, TSEQ, and the priority level. When a packet is received from a host via a LAN connection, the packet is retrieved from a priority queue based on the priority level a first logical network connection is selected for transmitting the packet. The packet is encapsulated in an encapsulating packet, and the payload of the encapsulating packet comprises the packet, GSEQ, TSEQ, PSEQ, and priority level of the packet. The encapsulating packet is then sent through the first logical network connection.

20 Claims, 11 Drawing Sheets

(51) Int. Cl.
  *H04L 12/865* (2013.01)
  *H04L 1/08* (2006.01)
  *H04L 12/863* (2013.01)
  *H04L 12/801* (2013.01)
  *H04L 12/749* (2013.01)

(52) U.S. Cl.
  CPC ........ *H04L 47/627* (2013.01); *H04L 2212/00* (2013.01)

(58) Field of Classification Search
  USPC .......................................... 370/235, 236, 392
  See application file for complete search history.

(56) References Cited

U.S. PATENT DOCUMENTS

| | | | |
|---|---|---|---|
| 9,369,398 B2* | 6/2016 | Chan | H04L 45/741 |
| 2002/0085578 A1 | 7/2002 | Dell | |
| 2002/0150078 A1* | 10/2002 | Ido | H04L 1/1809 370/349 |
| 2006/0023718 A1 | 2/2006 | Joly | |
| 2007/0219816 A1* | 9/2007 | Van Luchene | G06Q 10/06 705/80 |
| 2008/0008181 A1 | 10/2008 | Yamada | |
| 2012/0243413 A1 | 9/2012 | Roullier | |
| 2014/0226663 A1* | 8/2014 | Chan | H04L 45/741 370/392 |

FOREIGN PATENT DOCUMENTS

| | | |
|---|---|---|
| CN | 101018191 A | 8/2007 |
| CN | 101163248 A | 4/2008 |
| CN | 101252536 A | 8/2008 |
| CN | 101291546 A | 10/2008 |
| CN | 101478476 A | 7/2009 |
| WO | 2011064112 A1 | 6/2011 |

OTHER PUBLICATIONS

English language Abstract of EP 1211856 A1.
English language Abstract of CN 101478476 (Jul. 8, 2009).
English language Abstract of CN 101291546 (Oct. 22, 2008).
English language Abstract of CN 101018191 (Aug. 15, 2007).
English language Abstract of CN 101163248 (Apr. 16, 2008).
English language Abstract of CN 101252536 (Aug. 27, 2008).
International Search Report in International Application No. PCT/IB2012/055862, dated Jun. 6, 2013.
Written Opinion of the international Searching Authority in International Application No. PCT/IB2012/055862, dated Jun. 6, 2013.
Office Action in related Chinese Patent Application No. 201280076668.3, dated Mar. 27, 2017.

* cited by examiner

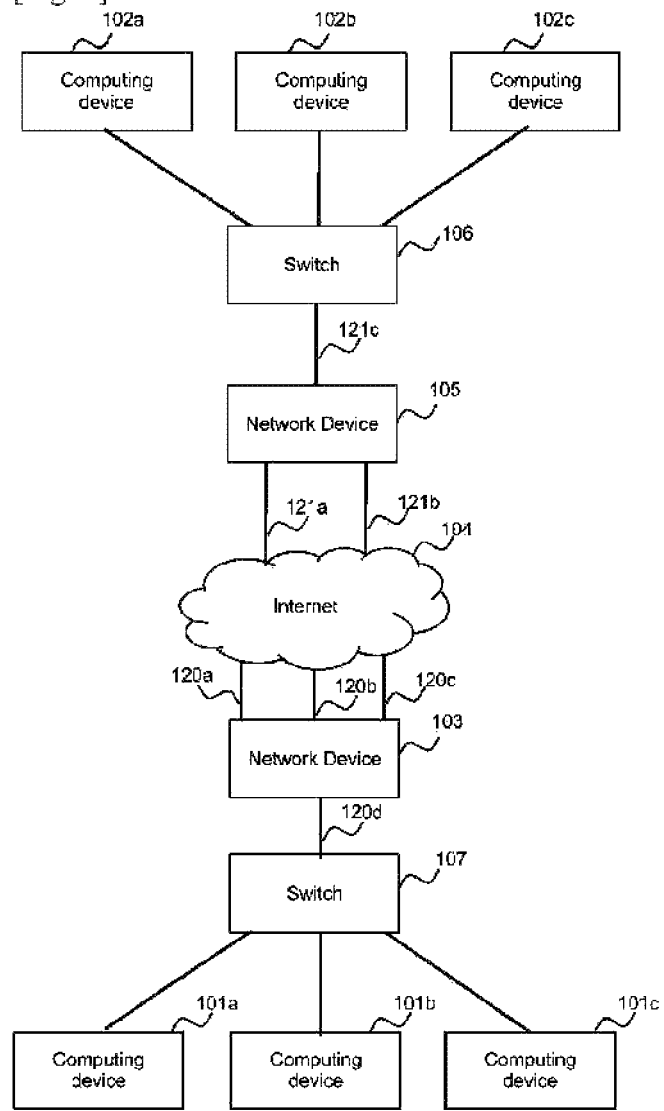
[Fig. 1]

[Fig. 2]
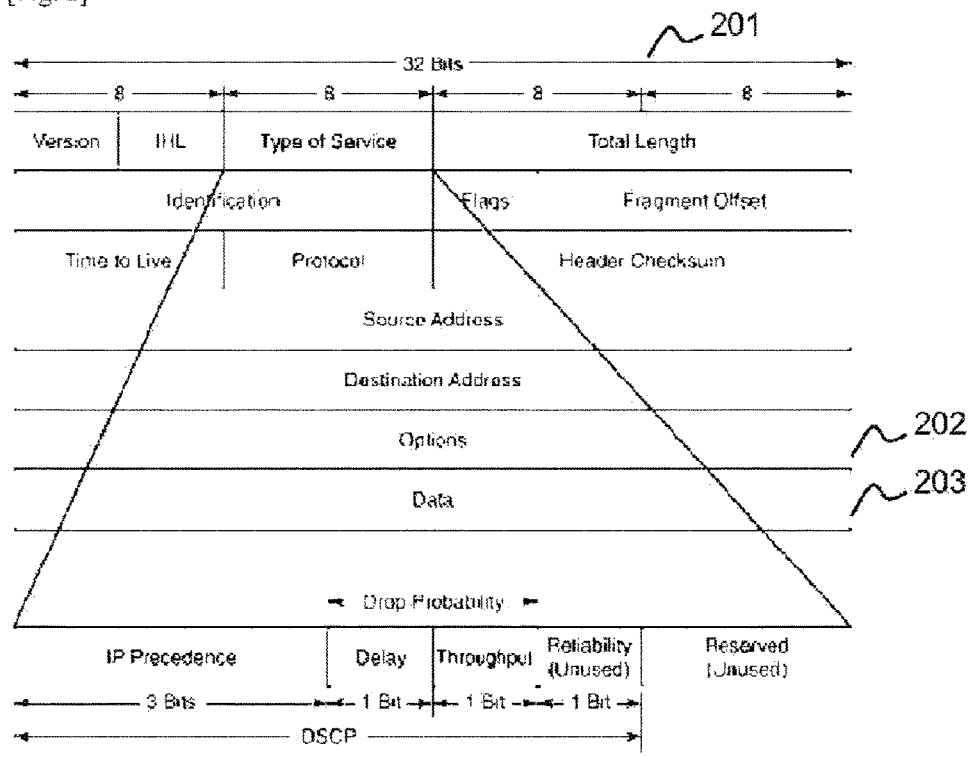
[Fig. 3]
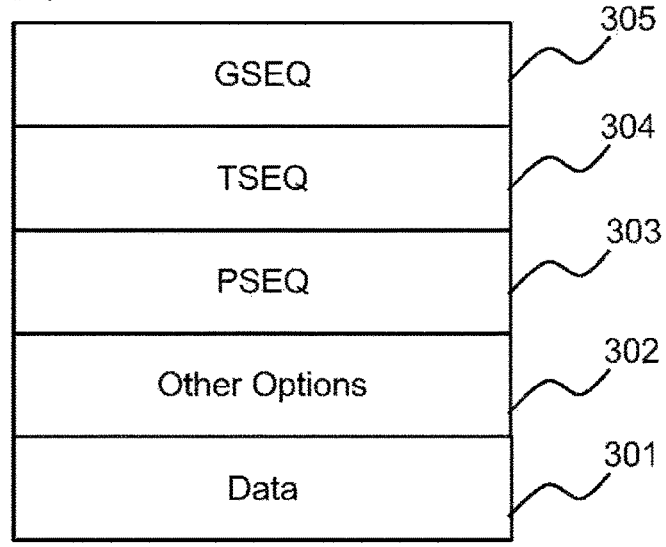

[Fig. 4]
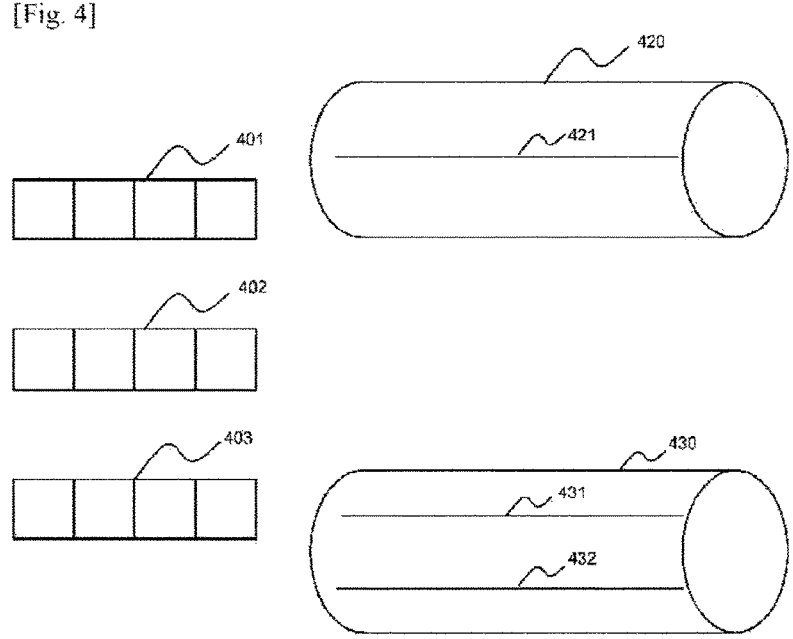
[Fig. 5A]
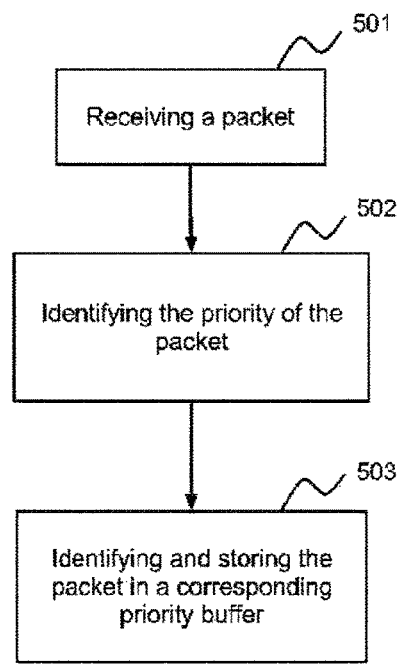

[Fig. 5B]
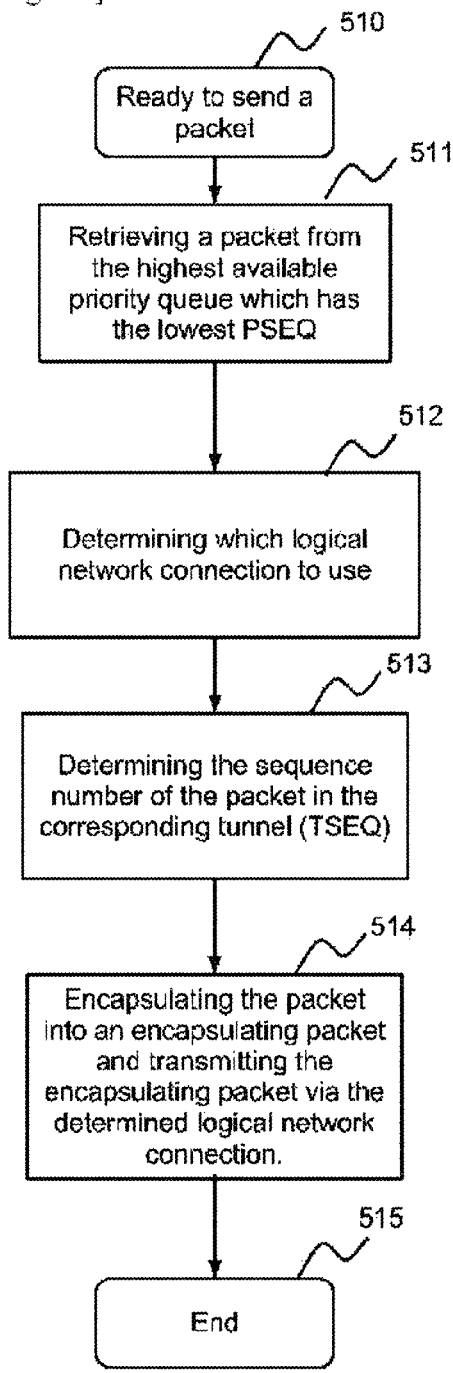

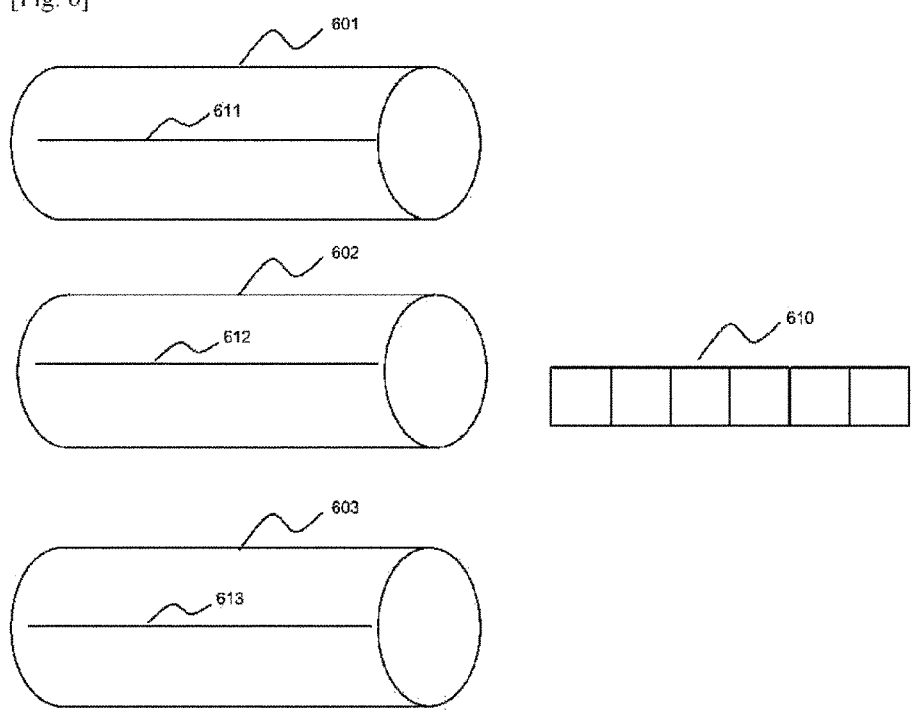
[Fig. 6]

[Fig. 7]
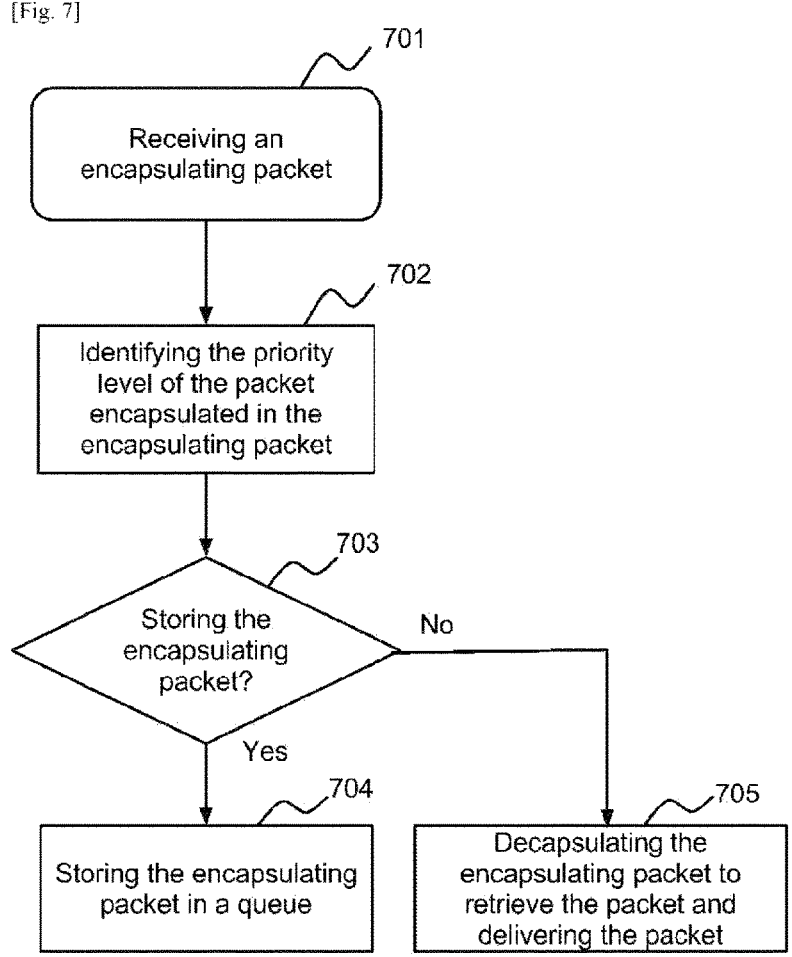

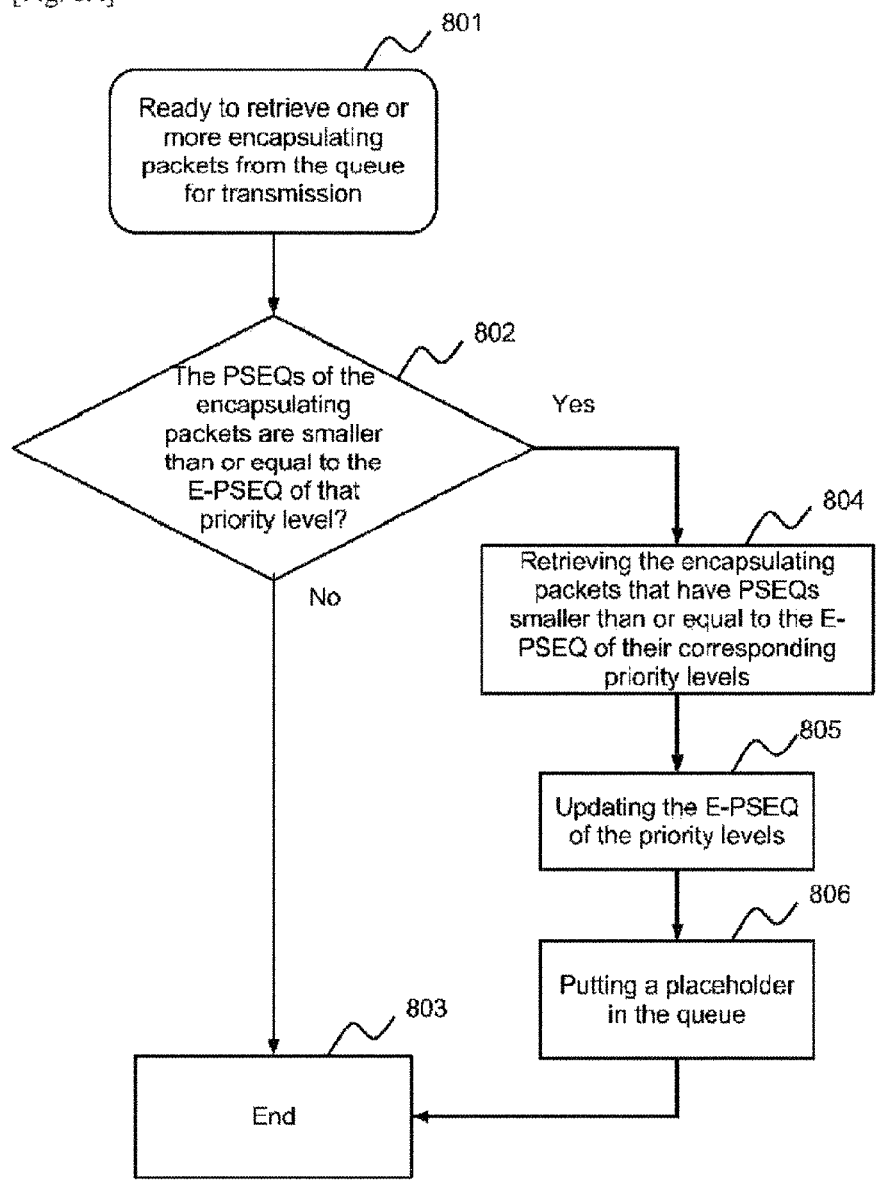
[Fig. 8A]

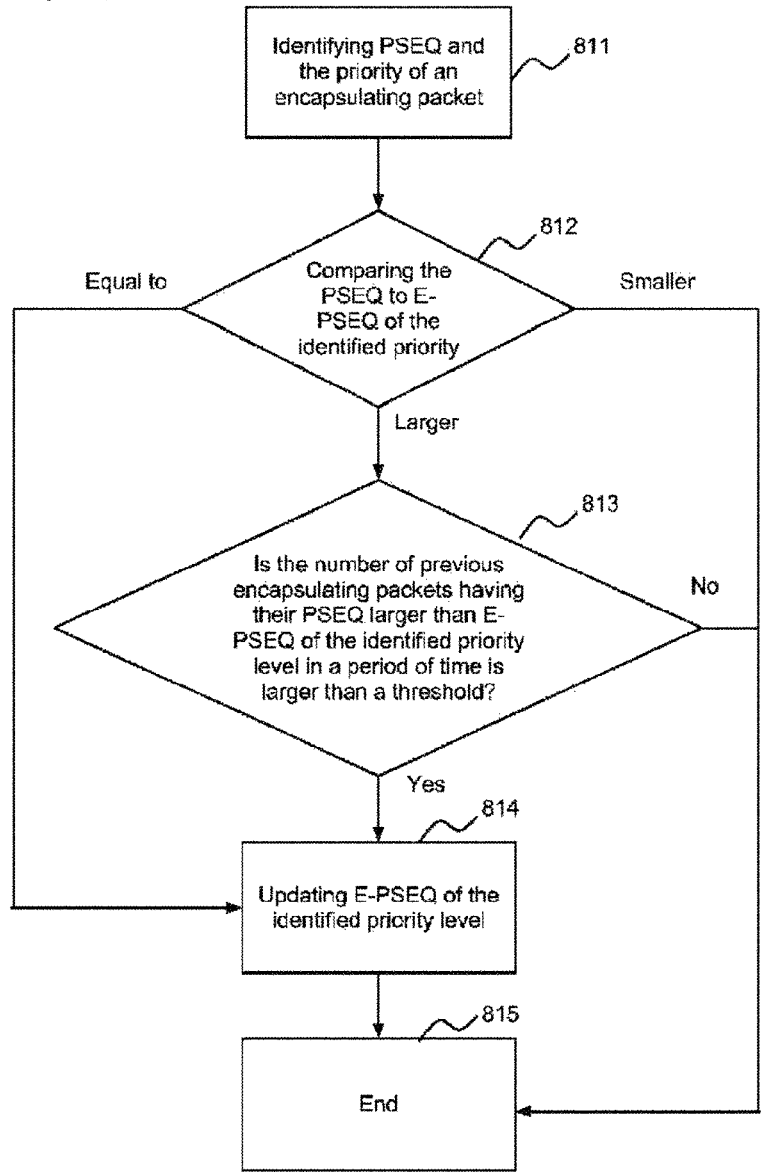

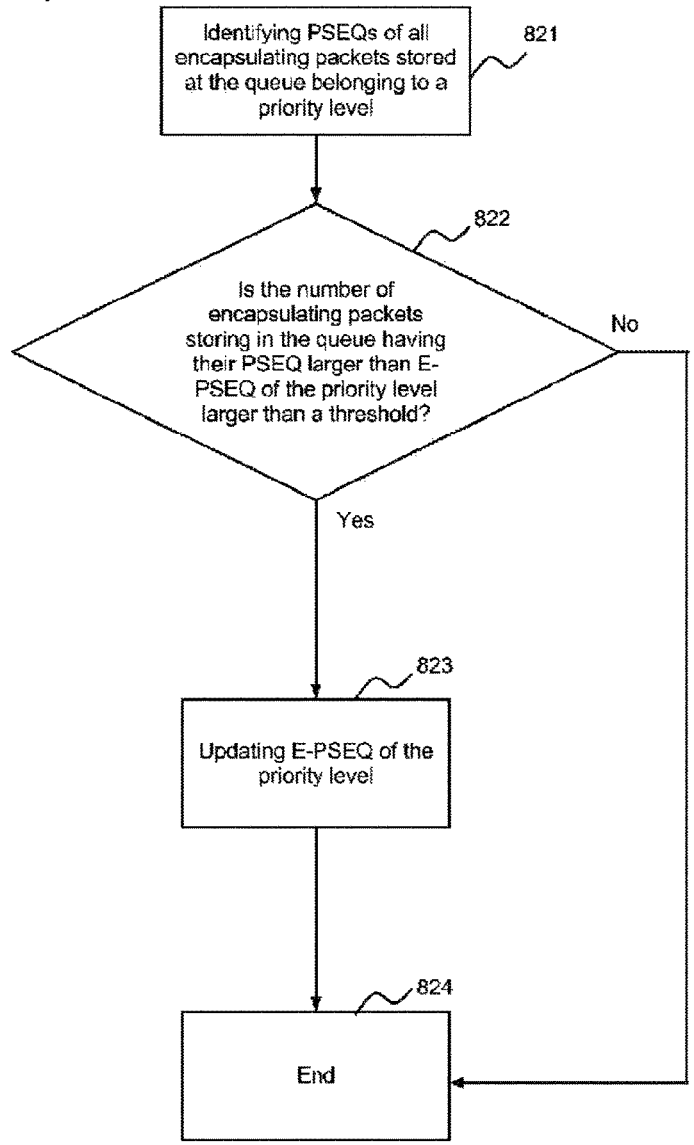

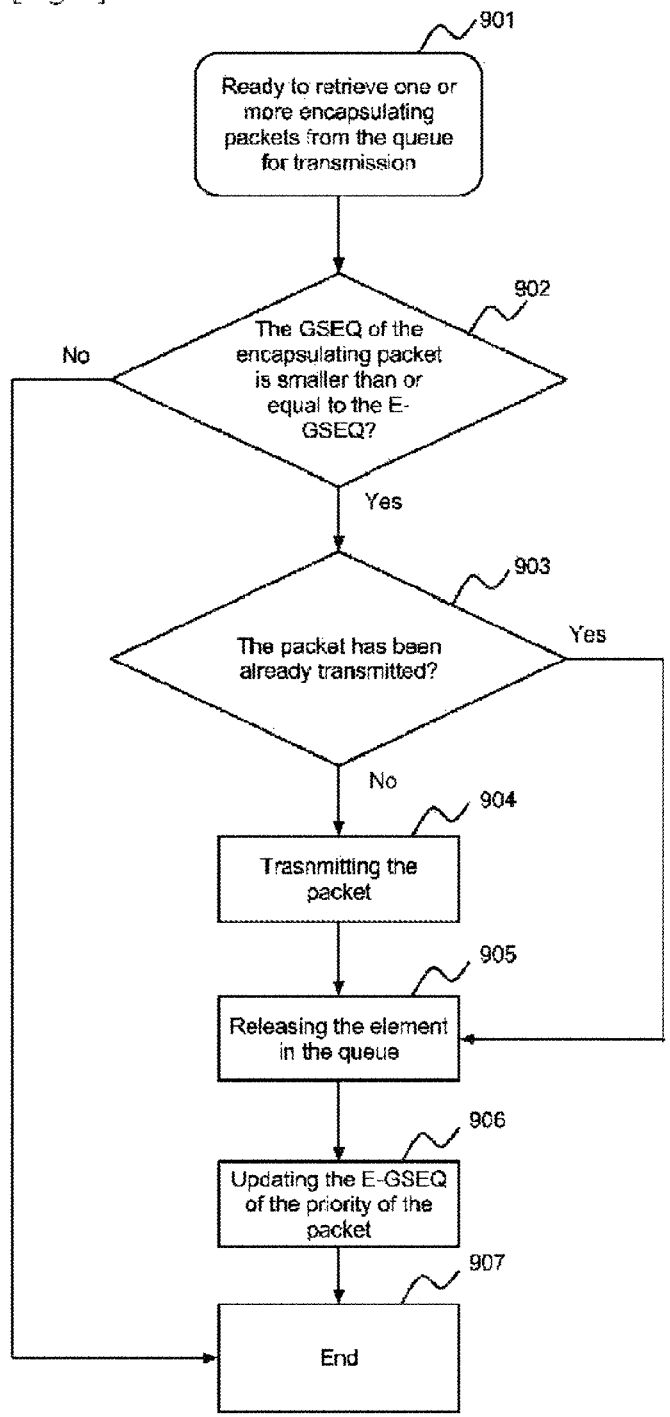
[Fig. 9]

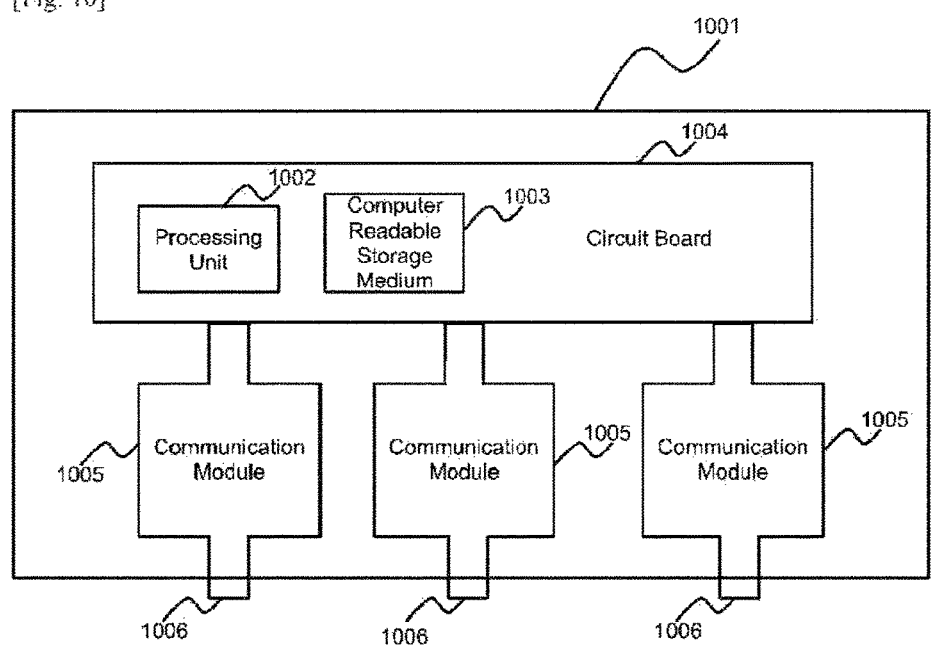
[Fig. 10]

METHODS AND SYSTEMS FOR RECEIVING AND TRANSMITTING PACKETS BASED ON PRIORITY LEVELS

RELATED APPLICATIONS

The present application is a Non-provisional continuation application which claims the benefits of and is based on U.S. application Ser. No. 14/003,237 titled "METHOD, DEVICE, AND SYSTEM TO PRIORITIZE ENCAPSULATING PACKETS IN A PLURALITY OF LOGICAL NETWORK CONNECTIONS"filed on 9 Apr. 2014. The contents of the above-referenced application are herein incorporated by reference.

TECHNICAL FIELD

The invention relates generally to transmitting and receiving encapsulating packets via a plurality of logical network connections, more particularly, to allow prioritization of encapsulating packets in the plurality of logical network connections.

BACKGROUND ART

It is a common known knowledge to those skilled in the art that encapsulating packet header can be used to differentiate an encapsulating packet in order to allow a network device to treat the packet with high priority or more importance. Referring now to FIG. 2, examples of an IPv4 packet header and a Type of Service field, which is updated to differentiated services (DiffServ) field, are shown. Packet marking technique to identify packets may include manipulation of the Differentiated Services Code Point (DSCP) sub-field of the Internet Protocol (IP) header Type of Service (TOS) field.

DiffServ may provide a networking architecture for classification and management of network traffic as well as Quality of Service (QoS) mechanisms. The DiffServ field may be used in a network layer protocol (e.g., IPv4, IPv6 and mobile IPv6) to make per-hop behavior (PHB) decisions about packet classification and traffic conditioning functions, such as metering, marking, shaping and policing. In FIG. 2, the DSCP field is within the Type of Service (ToS) field of the encapsulating packet header. The DSCP field may provide an indication of the abstract parameters of the quality of service desired. These parameters may be used to guide the selection of actual service parameters when transmitting a packet through a particular network. Several networks offer service precedence, which may treat high priority traffic as more important than other traffic (generally by accepting only traffic above certain precedence at time of high load). The standardized DiffServ field of the packet may be marked with a value so that the packet receives a particular forwarding treatment or PHB, at each network node.

At the transmitter network device, it is desirable for packets with higher priority to be transmitted earlier than packets with lower priority.

However, when an aggregated logical network connection is used to transmit and receive encapsulating packets, the encapsulating packets may be received by the receiver not in sequential order. It is known to those skilled in the art that packets decapsulated from the encapsulating packets should be sorted before being transmitted to the designated recipients. It is also known to those skilled in the art that the sorting can be carried out by using a global sequence number and per logical network connection sequence number encapsulated in the encapsulating packets along with the packets.

However, sorting packets can result in delay of transmitting packets when the global sequence numbers are not in sequential order at the receiving network device. When the transmissions of packets with higher priority are delayed due, to soiling, the impact of such delay is larger than those of packets with lower priority.

When a network device transmits or receives an encapsulating packet, the encapsulating packet may have a packet format of a usual IPv4 header shown in FIG. 2. It is to be noted that in the above description, it is assumed that the IPv4 header shown in FIG. 2 is used. However, the IPv4 header does not necessarily need to be used, and, a packet format of another arbitrary protocol, including IPv6 and mobile IPv6, may be used.

DISCLOSURE OF INVENTION

Summary

Prioritizing packets into different queues at a network device. The network device then selects one of a plurality of logical network connections to transmit the packet. A global sequence number and a priority sequence number are embedded along with the packet in an embedding packet. Packets with the highest priority are transmitted earlier than packets with lower priority. At the receiving network device, there is one queue for storing the received embedding packets. The receiving network device determines whether to store the embedded packets or to transmit the packets embedded in the embedding packet to the intended recipient based on the global sequence number and a priority sequence number.

DETAILED DESCRIPTIONS

The present invention has been made in view of the above circumstances, and an objective of the invention is to use priority queues, priority level and priority sequence numbers to solve the above-described problem.

A host can be a computing device, a laptop computer, a mobile phone, a smartphone, a desktop computer, a switch, a router or an electronic device that is capable of transmitting and receiving packets. A transmitting host is a host transmitting a packet. A transmitting host can also be a network device receiving packets from a host and then transmitting the packets according to policies and/or determined routes. A receiving host is a host receiving a packet. A receiving host can also be a network device receiving packets from a host and then transmitting the packets according to policies and/or determined routes. Therefore, a host can be a transmitting host and a receiving host.

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It is being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" or "computer readable storage medium" may represent one or more devices for storing data, including read only memory (ROM), random access memory (RAM), magnetic RAM, Flash, non-volatile core memory, magnetic disk storage mediums, optical storage mediums, flash memory devices and/or other machine readable mediums for storing information. The term "computer readable storage medium" includes, but is not limited to portable or fixed storage devices, optical, storage devices, wireless channels and various other mediums capable of storing, containing or carrying instruction(s) and/or data. A queue may be implemented by a section or a plurality sections in a storage medium.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processing unit(s) may perform the necessary tasks. A processing unit(s) by a CPU, an ASIC semiconductor chip, a semi-conductor chip, a logical unit, a digital processor, an analog processor, a FPGA or any processor that is capable of performing logical and arithmetic functions. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or via any suitable means including memory sharing, message passing, token passing, network transmission, etc.

A network device is capable of transmitting out encapsulating packets belonging to an aggregated logical network connection and receiving encapsulating packets belonging to the aggregated logical network connection. For readability, when the network device transmits encapsulating packets, the network device is defined as a VPN Sender Device and when the network device receives encapsulating packets belonging to an aggregated logical network connection, the network device is defined as a VPN Receiver Device. Therefore, network device 103 and 105 can be VPN Sender Device and VPN Receiver Device at the same time.

Aggregated Logical Network Connections

FIG. 1 illustrates a network environment in which two networks can be connected together via a plurality of logical network connections. The same network environment can also be employed to connect three or more networks via a plurality of logical network connections. Layer 2 network protocols that can be employed in the present invention includes Ethernet, Token Ring, Frame Relay, PPP, X.25 and ATM, Layer 3 network protocols that can be employed in the present invention include Internet Protocol (IP) version 4, IPv6, mobile IPv4, mobile IPv6, or the like.

Computing devices 101*a*, 101*b* and 101*c* are connected to switch 107 and are in the same network. Computing devices 102*a*, 102*b* and 102*c* are connected to switch 106 and are in another network. In order to allow computing devices 101*a*, 101*b*, and 101*c* to perceive if computing devices 102*a*, 102*b* and 102*c* are in the same OSI layer 2 or layer 3 network including the same Ethernet network or the same IP network, a virtual private network (VPN) has to be established among computing devices 101*a*, 101*b*, 101*c*, 102*a*, 102*b* and 102*c*. Network device 103 and network device 105 can be routers. Network device 103 and network device 105 together establish a logical network connection through the Internet 104 between switch 107 and switch 106. A switch may be combined with a router to form a networking device capable of connecting a plurality of networking devices and/or computing devices and form one or more VPNs. For example, switch 107 can be combined with network device 103.

When computing device 102*a* transmits a packet to computing device 101*a*, computing device 102*a* transmits the packet to switch 106. Switch 106 then transmits the packet to network device 105 via network link 121*c*. Network device 105 encapsulates the packet into one or more encapsulating packets, and then transmits the one or more encapsulating packets through Internet 104 using one of a plurality of logical network connections to network device 103. An aggregated logical network connection is formed by connecting networks through aggregating the plurality of logical network connection. A logical network connection can use connection-oriented protocol, such as Transmission Control Protocol (TCP), or a connectionless protocol, such as User Datagram Protocol (UDP), to transmit encapsulating packets. Well-known protocols for deploying logical network connections include Layer 2 Tunnelling Protocol (L2TP), secure shell (SSH) protocol, Multi-Protocol Label Switching (MPLS), and Microsoft's Point-to-Point Tunnelling Protocol (PPTP). A logical network connection is also known as a tunnel. A logical network connection between network device 103 and network device 105 is established by using one of network access links 120*a*, 120*b* and 120*c*, one of network access links 121*a* and 121*b*, and the Internet 104. Network access links 120*a*, 120*b*, and 120*c* are connected to network device 103 through three network interfaces respectively. Similarly network access links 121*a* and 121*b* are connected to network device 105 through two network interfaces respectively. A network access link is in form of optical fiber, Ethernet, ATM, Frame Relay, T1/E1, IPv4, IPv6, wireless technologies, Wi-Fi, WiMax, High-Speed Packet Access technology, 3GPP Long Term Evolution (LTE) or the like.

In an aggregated logical network connection, packets belonging to a session, a presentation, or an application may be transmitted and received via different logical network connections of the aggregated logical network connection. From the perspective of a session, a presentation, or an application, the plurality of logical network connections act like a single logical network connection. An aggregated logical network connection is also known as aggregated tunnels or bonded VPN.

When network device 103 receives the one or more encapsulating packets from network device 105 via logical network connections in the aggregated logical network connection, network device 103 decapsulates the one or more encapsulating packets to retrieve the packet and then transmits the data back to a designated computing device, i.e. computing device 101a via network link 120d and switch 107.

Packet Format

FIG. 3 is an illustration of a format of data field 203 of FIG. 2 belonging to an encapsulating packet and payload according to one of the embodiments of the present invention. An encapsulating packet is an encapsulating packet encapsulating a packet which is either a layer 2 packet or a layer 3 packet. The packet is encapsulated in data field 301. Global sequence number (GSEQ) field 305, logical network connection sequence number (TSEQ) field 304, priority sequence number (PSEQ) field 303, other options field 302 and data field 301 together form the payload of an encapsulating packet, which is data field 203. Priority level of the packet is also stored in the payload in the encapsulating packet and can be represented by two or more bits. The ordering of GSEQ, TSEQ, PSEQ and priority level do not need to follow the embodiments of FIG. 3. Other orderings are valid as long as the receiving network device of the encapsulating packet is able to recognize the GSEQ, TSEQ, PSEQ and priority level. According to one of the embodiments of the present invention, length of the priority level is represented by three bits and therefore can accommodate up to eight different priorities. According to one of the embodiments of the present invention, the length of the priority level is represented by one eight-bit byte and therefore can accommodate up to two hundred and fifty-six different priorities. According to one of the embodiments of the present invention, the length of the priority level is represented by sixteen bits and therefore can accommodate up to sixty five thousand five hundred and thirty five different priorities.

Destination address of the encapsulating packet can be the IP address of the VPN Receiver Device. Source address of the encapsulating packet is one of the IP addresses of the VPN Sender Device. The formats of IP address for IPv4 and IPv6 follow IETF RFC 791 and IETF RFC 2460 respectively. Encapsulating packet format follows IPv4 description in IETF RFC 791, IPv6 description in IETF RFC 2460, and different IETF RFC documents. For example, in IPv4, headers of an encapsulating packet contains version, IHL, type of service, total length, identification, flags, fragment offset, time to live, protocol and header checksum. Those skilled in the art would appreciate how to place GSEQ, TSEQ, PSEQ and other options in different versions of encapsulating packet.

GSEQ field 305 stores GSEQ, which is used to indicate sequence of packets received by the network device. A GSEQ is unique during the life of the aggregated logical network connection unless the GSEQ is larger than the value which GSEQ field 305 can hold and in that case, the GSEQ will restart from zero. When the VPN Sender Device transmits the encapsulating packet to a VPN Receiver Device, sequence of encapsulating packets leaving the VPN Sender Device may not follow the GSEQ. Normally, an encapsulating packet transmitted by the VPN Sender Device to the VPN Receiver Device earlier has a lower GSEQ than another encapsulating packet transmitted by the VPN Sender Device to the VPN Receiver Device later to indicate the sequence of packets leaving the VPN Sender Device. However, due to queuing delay at a logical network connection and/or priority difference, a first encapsulating packet leaving the VPN Sender Device earlier may have a higher GSEQ than the GSEQ of a second encapsulating packet leaving the VPN Sender Device later even though the packet encapsulated in the first encapsulating packet arrived at the VPN Sender Device later than the packet encapsulated in the second encapsulating packet.

TSEQ field 304 holds TSEQ, which is used to indicate a sequence of packets transmitted by a VPN Sender Device, transmitted via a logical network connection. A TSEQ is unique during the life of a logical network connection unless the TSEQ is larger than the value that TSEQ field 304 can hold and in that case, the TSEQ will restart from zero. When an encapsulating packet is ready for transmission, the encapsulating packet is placed at a queue of the logical network connection. According to one of the embodiments of the present invention, encapsulating packets in a logical network connection queue are transmitted by the VPN Sender Device sequentially according to the TSEQ. The number of logical network connection queues corresponds to the number of logical network connections. For example, if there are five logical network connections in a VPN, there are five logical network connection queues. The TSEQs of encapsulating packets in each logical network connection should be in order when the VPN Sender Device channel.

According to one of the embodiments of the present invention, encapsulating packets in a logical network connection queue are transmitted by the VPN Sender Device sequentially according to the TSEQ and the priority level and therefore the TSEQs of encapsulating packets leaving the VPN Sender Device may not be in order. Therefore, in this embodiment, if there are five logical network connections in a VPN, there are five logical network connection queues. The TSEQs of encapsulating packets in each logical network connection may not be in order when leaving each corresponding channel because encapsulating packets with higher priority packet may be transmitted earlier in a logical network connection.

Packet with higher priority should be transmitted sooner than packet with lower priority. Those skilled in the art may have different techniques to indicate priority for a packet.

PSEQ field 303 holds PSEQ, which is used to indicate the sequence of packets having the same priority. The PSEQ of each priority level is unique during the life of an aggregated plurality of logical network connection unless the PSEQ is larger than the value that PSEQ field 303 can hold and in that case, the PSEQ will restart from zero.

The lengths of PSEQ field 303, TSEQ field 304 and GSEQ file 305 do not need to be the same and are at least eight bits long. The more number of bits used, the larger the PSEQ, TSEQ and GSEQ can be. According to one of the embodiments of the present invention, the number of bits used to represent PSEQ, TSEQ and GSEQ are thirty-two bits and therefore the length of PSEQ field 305, TSEQ field 304 and GSEQ field 305 are thirty-two bits long.

Other options field 302 is optional. In one variant, there is no other options field 302 in one of the embodiments of the present invention. In one of the embodiments of the present invention, there is other options field 302 to store information that can assist the VPN Sender Device and/or VPN Receiver Device to process the encapsulating packet. For example, other options field 302 may store network information, latency information, error correction information, authentication information, encryption information, and etc.

For IPv6 packet, in one of the embodiments of the present invention, GSEQ, TSEQ, PSEQ and other options are placed in an extension header and are placed after the IPv6 header. In one of the embodiments of the present invention, GSEQ, TSEQ, PSEQ and other options are placed in the payload of an IPv6 packet.

According to one of the embodiments of the present invention, a packet with smaller GSEQ should be received by a VPN Sender Device earlier than a packet with a larger GSEQ. In one variant, the opposite is true. Therefore a packet with smaller GSEQ is received by a VPN Sender Device later than a packet with a larger a GSEQ. As the VPN Sender Device is consistent in how GSEQ is set according to the chronology of packet arrival and the VPN Receiver Device is aware of the setting. The same also applies to TSEQ, PSEQ, and priority level that as long as the VPN Sender Device uses a consistent scheme to set values of TSEQ, PSEQ, and priority level and the VPN Receiver Device is aware of the consistent way to set the values. Those skilled in the arts have many different schemes to set GSEQ, TSEQ, PSEQ, and priority level.

Transmitting Packet

FIG. 5, which should be viewed in conjunction with FIG. 1 and FIG. 4, is a flow-chart illustrating a process in which a VPN Sender Device transmits an encapsulating packet.

FIG. 4 illustrates the relationship among packets received by network device 105, which is the VPN Sender Device in this illustration, priority queues 401, 402 and 403, logical network connections 421, 431 and 432, and network access links 420 and 430 according to one of the embodiments of the present invention. Network device 105 receives packets from switch 106, via a first network interface of network device 105. Switch 106 receives the packets from one of computing devices 102a, 102b and 102c. The packets are intended to be transmitted by network device 105 to network device 103, which is a VPN Receiver Device in this illustration. Network access links 420 and 430 are network access links 121a and 121b respectively in this illustration.

Priority queues 401, 402 and 403 are three queues belonging to different priorities. For example, if there are three priorities, priority queue 401 is a queue for the highest priority, priority queue 402 is a queue for the middle priority, and priority queue 403 is a queue for the lowest priority. For example, if there are sixteen, priorities, there are sixteen priority queues. Priority queue may be an array, a linked list, a tree or other kinds of data structure that can be implemented in a computer readable storage medium. A priority queue is able to hold data, including a plurality of packets or encapsulating packets. Those skilled in the art should appreciate that there are many known techniques to implement queues. For example, different priority queues can be implemented by a single queue with different indices, by a common array, by a single memory unit, etc. Packets are assigned with PSEQ according to the priority queues in which the packets are stored.

Network access link 420 has one logical network connection 421 established inside. Network access link 430 has two logical network connections 431 and 432 established inside. Logical network connections 421, 431 and 432 are aggregated together to form one logical network connection from computing devices perspectives. For example, each Ethernet packet originating from computing device 102a may be received by computing device 101a via any of the logical network connections 421, 431 or 432. Another example, each encapsulating packet belonging to a TCP session originating from computing device 102c may be received by computing device 101b via logical network connections 421, 431 or 432. Therefore, the first encapsulating packet of a TCP session may be received by computing device 101b via logical network connections 432 and the second encapsulating packet of the same TCP session may be received by computing device 101b via logical network connections 421.

When network device 105 receives a packet from the first network interface at step 501, network device 105 determines which priority level the packet belongs to at step 502. Network device 105 may determine the priority level according to port number of the packet, content of the packet, type of service field in the packet, and other common packet inspection techniques known by those skilled in the art. At step 503, network device 105 stores the packet in a priority queue corresponding to the priority level determined.

When network device 105 determines that it is able to transmit a packet to network device 103 at step 510, network device 105 at step 511 retrieves a packet from one of the priority queues which has lowest PSEQ in the priority queue. There are many techniques to select the priority queue, which includes selecting the highest priority queue first and the lowest priority queue last, selecting the priority queue which has a packet having been stored for the longest time, selecting the priority queue with the largest number of packets, selecting a priority queue according to an equation, and selecting a priority queue according to a policy. According to one of the embodiments of the present, invention, a packet that has been stored the longest in the highest priority queue is selected first, and if there is no packet in the highest priority queue, a packet that has been stored the longest in the next highest priority queue is then selected. The packet selection process continues until the lowest priority queue is selected. If there is still no packet available in the lowest priority queue, no, packet is retrieved from any of the priority queues and no encapsulating packet is transmitted to network device 103. For illustration purposes, network device 105 first tries to retrieve a packet with lowest PSEQ from priority queue 401. If there is no packet in priority queue 401, network device 105 then tries to retrieve a packet with lowest PSEQ from priority queue 402. If there is also no packet in priority queue 402, network device 105 then tries to retrieve a packet with lowest PSEQ from priority queue 403. This retrieving arrangement tries to have packets with the highest priority transmitted first. The reason a packet with lowest PSEQ in a priority queue is selected is that a lowest PSEQ indicates that the packet has arrived at network device 105 the earliest among all packets in that priority queue. It would be appreciate that other techniques can be employed if ordering of PSEQ is not used to indicate a sequence of arrival of packets at network device 103.

At step 512, network device 105 makes a decision to select logical network connection among logical network connections 421, 431 and 432 to be used to transmit the packet. The decision to select logical network connections to be used depends on policies configurable by the administrator of network device 105, policies determined by the manufacturer of network device 105, or a combination of both.

At step 513, network device 105 assigns a TSEQ according to the logical network connection selected in step 513. At step 514, GSEQ, TSEQ, PSEQ, the priority level determined and the packet retrieved are combined together to form data payload of an encapsulating packet, which is then transmitted to network device 103 via one of the logical network connections of logical network connections 421, 431 and 432. In one variant, GSEQ, TSEQ, PSEQ, the priority level determined and the packet retrieved are encapsulated in the encapsulating packet.

The TSEQ is determined by network device 105 and is stored at the TSEQ field of an encapsulating packet in the selected logical network connection queue. The GSEQ and PSEQ which have been assigned already are also stored in the encapsulating packet in their respective fields along with the packet encapsulated in the data field. The creation and the format of the encapsulating packet are in accordance to the descriptions in relation to FIG. 3 discussed above.

When an encapsulating packet is not transmitted via an originally selected logical network connection due to a network error or other reasons, the encapsulating packet is re-transmitted either using the same logical network connection or a second logical network connection. When the encapsulating packet is re-transmitted using the same logical network connection, the TSEQ, PSEQ and GSEQ remain the same. When the encapsulating packet is re-transmitted using the second logical network connection, the GSEQ and PSEQ in the encapsulating packet remain the same but the TSEQ is different because the second logical network connection has different TSEQ. Therefore, the encapsulating packet is stored in the logical network connection queue of the second logical network connection before being transmitted through the second logical network connection. The decision concerning when to use the same logical network connection and when to use the second logical network connection depends on policies configured by the network administrator of network device 105 or predefined by the manufacturer of network device 105. Those skilled in the art will appreciate many different ways to configure or define the policies. When an encapsulating packet is moved to another logical network connection queue, header fields of the encapsulating packet, such as destination address, source address and checksum are updated to reflect the move. Those skilled in the art would know what headers fields have to be updated. This also applies to a situation when a logical network connection is no longer in operation and all encapsulating packets that are stored in the first logical network connection are moved to logical network connection queues of other logical network connections. The process of transmitting the encapsulating packet stops at step 515.

According to one of embodiments of the present invention, network device 105 is ready to transmit an encapsulating packet when the it has enough processing power, a predefined storage time for a packet is reached, the network access link is ready, a logical network connection is ready, there is enough buffer at the logical network connection and or other reasons to allow the VPN Sender Device to transmit the encapsulating packet that are commonly known to those skilled in the arts.

According to one of the embodiments of the present invention, GSEQ, PSEQ and TSEQ are assigned before the packet is retrieved from priority queue and forwarded by network device 105 at step 514. According to one of the embodiments of the present invention, GSEQ is assigned when the packet is stored in a priority queue; PSEQ and TSEQ are then assigned after the packet is retrieved from priority queue and before a corresponding encapsulating packet is created. According to one of the embodiments of the present invention, GSEQ and PSEQ assigned when a packet is stored in a priority queue and TSEQ is assigned before the encapsulating packet is sent. The assignments of GSEQ, PSEQ and TSEQ can be implemented at different stages. The decision of how and when the GSEQ, PSEQ and TSEQ are assigned matches with how network device 105 sorts encapsulating packets using GSEQ, PSEQ and TSEQ.

It is known to those skilled in the art that other fields of the encapsulating packet have to be updated, including checksum, when GSEQ, PSEQ, TSEQ and priority level are stored and/or modified.

According to one of the embodiments of the present invention, network device 105 follows policies for selecting logical network connections. Policies include using a logical network connection with lowest latency for highest priority level packets, using a logical network connection with largest transfer rate for highest priority level packets, using a logical network connection with lowest cost for lowest priority level packets, using all the logical network connections evenly when transfer rate and latency of the logical network connections are within predefined ranges for packets that do not belong to the highest priority level, distributing packets to all the logical network connections with a priority level weighted distribution, and allowing the use of lowest latency logical network connection for non-highest priority level packets only when there is no highest priority level packets waiting to be sent. According to one of the embodiments of the present invention, there is a plurality of policies for selecting which logical network connections to be used and each policy is assigned with a policy priority level for solving conflicts among policies.

The aims of using policies to select which logical network connections to be used include reducing latency, effective use of bandwidth and lowering cost. The policies that are used to select logical network connections include policies using latency, packet drop, delay, bandwidth, number of sessions allowed, price, and usage. For example, a policy for selecting logical network rconnection is to prefer using the logical network connection with lowest latency. In another example, a policy for selecting logical network connection is based on the bandwidth available for each of the logical network connection. It is preferred to transmit the encapsulating packet via the logical network connection which has more bandwidth. In another example, a policy for selecting logical network connection is based on the number of packet drops in a period of time experienced in each of the logical network connection. It is preferred to transmit the encapsulating packet via the logical network connection which has fewer packet drops. In another example, a policy for selecting logical network connection is based on the delay experienced in each of the logical network connection. It is preferred to transmit the encapsulating packet via the logical network connection which has less delay. In another example, a policy for selecting logical network connection is based on the usage of the each of the logical network connection. It is preferred to transmit the encapsulating packet via the logical network connection which has been used less frequent. In another example, a policy for selecting logical network connection is based on the number of sessions carried by each of the logical network connection. It is preferred to transmit the encapsulating packet via the logical network connection which has fewer sessions, such as TCP sessions. In another example, a policy for selecting logical network connection is based on the pricing of transmitting encapsulating packets at the time of transmission. It is preferred to transmit the encapsulating packet via the logical network connection which costs less.

According to one of the embodiments of the present invention, only the payload of an encapsulating packet is encrypted. Therefore only the packet encapsulated in the encapsulating packet is encrypted while GSEQ, PSEQ, TSEQ, and priority levels are not encrypted. Additionally or alternatively, at, least one of the priority level, global sequence number and priority sequence number stored at the other options field of the encapsulating packet is encrypted.

Receiving Packet

FIG. 6 illustrates a relationship among encapsulating packets transmitted by network device 105 and received by network device 103 through the Internet or inter-connected networks that are connected to one of network interfaces of network device 105, queue 610, and network access links 601, 602 and 603 according to one of the embodiments of the present invention.

Network access links 601, 602 and 603 are network access links 120a, 120b and 120c respectively in this illustration. Logical network connections 611, 612 and 613 are established in network access link links 601, 602 and 603 respectively. For illustration purpose, logical network connection 421 and logical network connection 611 are the same logical network connection; logical network connection 431 and logical network connection 612 are the same logical network connection: and logical network connection 432 and logical network connection 612 are the same logical network connection. Therefore, an encapsulating packet may be transmitted by network device 105 through logical network connection 431, which is also logical network connection 612, and received by network device 103.

Queue 610 may be an array, a linked list, a tree or other kinds of data structure that can be implemented in a computer readable storage medium. Queue 610 holds a plurality of elements. Each element is a unit of storage. According to one of the embodiments of the present invention, the format of the encapsulating packet follows the, description of FIG. 3 above.

Logical network connections 611, 612 and 613 are aggregated together to form one logical connection. For example, each Ethernet packet originating from computing device 102a may be received by computing device 101a via logical network connections 603, 604 and 605. In another example, each encapsulating packet belonging to a video stream session originating from computing device 102c may be received by computing device 101b via logical network connections 603, 604 and 605. Therefore, a first encapsulating packet of the video stream may be received by computing device 101b via logical network connections 603 and a second encapsulating packet of the same video stream may be received by computing device 101b via logical network connections 602.

For each priority level, there is one expected priority sequence number (E-PSEQ). E-PSEQ is used to hold the PSEQ expected for an encapsulating packet with a priority arriving next. For example, if there are eight priorities, there are eight E-PSEQs.

Elements in queue 610 are used to store encapsulating packets. The reason for having queue 610 is to sort encapsulating packets. There is an expected global sequence number (E-GSEQ) used to hold the GSEQ expected for the encapsulating packet arriving next.

FIG. 7, which should be viewed in conjunction with FIG. 1 and FIG. 6, is a flow-chart illustrating a process of a VPN Receiver Device, such as network device 103, receiving an encapsulating packet.

After network device 103 has received an encapsulating packet through one of the aggregated logical network connections from one of the network interfaces of network device 103 at step 701, network device 103 identifies the priority level of the packet encapsulated in the encapsulating packet at step 702. At step 703, network device 103 determines whether or not to store the encapsulating packet in a queue 610. The encapsulating packet is stored in queue 610 at step 704 if network device 103 determines to store the encapsulating packet. If network device 103 determines not to store the encapsulating packet or it is ready to transmit the packet, the encapsulating packet, such as an IP packet or Ethernet packet, in the encapsulating packet is decapsulated to retrieve the packet and the packet is transmitted at step 705.

According to one of the embodiments of the present invention, at step 702, the encapsulating packet is decapsulated to retrieve the packet and it is the packet, instead of the encapsulating packet, being stored in queue 610 at step 704. Therefore, at step 703, network device 103 determines whether to store the packet in a queue 610. In addition, at step 705, there is no further need for decapsulating the packet before transmitting the packet.

According to one of the embodiments of the present invention, network device 103 also identifies GSEQ, PSEQ, TSEQ of the packet encapsulated in the encapsulating packet at step 702. When the GSEQ is larger than the E-GSEQ, the encapsulating packet is stored in one of the elements of queue 610 at step 704.

According to one of the embodiments of the present, invention, when the GSEQ is larger than the E-GSEQ but the PSEQ is smaller or equal to the E-PSEQ of the PSEQ corresponding priority level, the encapsulating packet is not stored in queue 610. Instead, a placeholder is stored in one of the elements of queue 610 at step 703 and the encapsulating packet is transmitted.

According to one of the embodiments of the present invention, there are two methods to retrieve an encapsulating packet from queue 610 for transmission. The first method is to retrieve an encapsulating packet according to a comparison made between PSEQ and the E-PSEQ of the corresponding priority level. The first method is illustrated in FIG. 8A. The second method is to retrieve an, encapsulating packet according to a comparison made between GSEQ and E-GSEQ of the corresponding priority level. If the GSEQ is larger than E-GSEQ, the encapsulating packet is not retrieved. If the GSEQ is smaller than or equal to E-GSEQ, the encapsulating packet is retrieved.

FIG. 8A, which should be viewed in conjunction with FIG. 6 and FIG.7, is a flow-chart illustrating the process of the first method. At step 801, a network device 103 is ready to retrieve an encapsulating packet from queue 610 for transmission. This happens when network device 103 has enough processing power, a predefined period of time is reached, anew encapsulating packet arrived, the receiver of the packet is ready to receive the packet, there is enough queue for receiving the packet and/or other reasons to allow network device 103 to retrieve the encapsulating packet from, a corresponding element of queue 610 that are commonly known to those skilled in the arts.

At step 802, encapsulating packets stored at queue 610 are examined to check whether their PSEQs are smaller than or equal to the E-PSEQ of their corresponding priorities. If there is no encapsulating packet with PSEQ that is smaller than or equal to the E-PSEQ of its corresponding priority level, no encapsulating packet is retrieved from queue 601, and the process stops at step 803. On the other hand, encapsulating packets with PSEQs that are smaller than or equal to the E-PSEQ of their corresponding priority levels are retrieved and transmitted at step 804. At step 805, one or more E-PSEQs that are corresponding to the priority levels of the one or, more, retrieved and transmitted encapsulating packets are updated to indicate that there are one or more encapsulating packets that have been retrieved and transmitted. At step 806, one or more placeholders are put in the queues at the positions where the retrieved encapsulating packets were originally placed. This step is to facilitate operation of the second method. The format and content of a placeholder can be anything as long as it has the same GSEQ of the retrieved encapsulating packet. The placeholder is used to indicate that an encapsulating packet has been retrieved during the operation of the second method. Packets encapsulated in the data field of the retrieved encapsulating packets can be transmitted between the steps of 804 and 805, between the steps of 805 and 806.

By using the first method alone, encapsulating packets are be transmitted according to the order of PSEQ of a priority level. Therefore, the encapsulating packets are transmitted in correct order of the priority level. This allows encapsulating packets to be transmitted without the use of GSEQ. Therefore, it is possible that encapsulating packets with GSEQs higher than E-GSEQ are transmitted earlier than encapsulating packets with GSEQs lower than E-GSEQ. It is also possible that encapsulating packets are transmitted not according to GSEQ order. The benefit of this is that encapsulating packets with higher priority levels are transmitted without waiting for encapsulating packets with lower GSEQ. Therefore the order of packets arriving at VPN Sender Device for VPN Receiver Device may be different from the order of encapsulating packets, which encapsulate the packets, transmitted by VPN Receiver Device.

FIG. 8B is an illustration of one of embodiments of present invention for a process to update E-PSEQ. When VPN Receiver Device receives an encapsulating packet, it identifies the PSEQ and the priority level of the encapsulating packet at step 811. At step 812, the PSEQ of the encapsulating packet is compared against the E-PSEQ of the identified'priority level.

For example, if the PSEQ and priority level of an encapsulating packet are ten and three respectively, the PSEQ is compared to the E-PSEQ of priority level three. In another example, if the PSEQ and priority level of an encapsulating packet are twenty-three and one respectively, the PSEQ is compared to the E-PSEQ of priority level one.

If the PSEQ of the encapsulating packet is smaller than the E-PSEQ of the identified priority level, there is no need to update the E-PSEQ because the VPN IP has arrived at the VPN Receiver Device later than expected. If the PSEQ of the encapsulating packet is equal to the E-PSEQ of the identified priority level, the E-PSEQ of the identified priority level is updated by increasing value of the E-PSEQ of the identified priority level by one at step 814 because the encapsulating packet has arrived at the VPN Receiver Device in sequence as expected. If the PSEQ of the encapsulating packet is larger than the E-PSEQ of the identified priority level, it is possible that the encapsulating packet has arrived earlier than expected or the estimation of the E-PSEQ of the identified priority level is not accurate. The estimation of the E-PSEQ of the identified priority level is not accurate if there are one or more encapsulating packets unable to reach the VPN Receiver Device in time. When there is a plurality of encapsulating packets having their PSEQ larger than E-PSEQ of the identified priority level in a predefined period of time, and the number of the plurality of encapsulating packets is larger than a threshold at step 813, it is an indication that the estimation of the E-PSEQ of the identified priority level is not accurate and E-PSEQ of the identified priority level is updated to the largest PSEQ of the most recent encapsulating packet of the identified priority level. E-PSEQ of the identified priority level is updated to the largest PSEQ among all the encapsulating packets stored at queue 610 and belonging to the identified priority level at step 814.

The value of the threshold for the number of encapsulating packets having their PSEQ larger than E-PSEQ of the identified priority level in a period of time can be set by administrator, by the manufacturer of the VPN Receiver Device or estimated by the VPN Receiver Device. According to one of the embodiments of the present invention, the threshold for the number of encapsulating packets having their PSEQ larger than E-PSEQ of the identified priority level in a predefined period of time is in the range of ten packets to one hundred packets. According to one of the embodiments of the present invention, the threshold for the number of encapsulating packets having their PSEQ larger than E-PSEQ of the identified priority level in a period of time is in the range of three packets to, twenty packets for higher priority level traffic.

The value of the pre-defined period of time can also be set by an administrator, by the manufacturer of the VPN Receiver Device or estimated by the VPN Receiver Device. According to one of the embodiments of the present invention, the range of the predefined period of time is between 10 milliseconds to 5 seconds. According to one of the embodiments of the present invention, the range of the predefined period of time for higher priority level traffic is between 5 milliseconds to 100 milliseconds.

FIG. 8C is an illustration of one of embodiments of present invention for a process to update E-PSEQ. The steps shown in FIG. 8C are similar to those in FIG. 8B. The main difference between FIG. 8B and FIG. 8C is that the process of FIG. 8B is triggered by an arrival of an encapsulating packet at the VPN Receiver Device while the process of FIG. 8C is triggered by periodic examination of encapsulating packets that have been stored in queue 610. The frequency of periodic examination can be set by administrator or by the manufacturer of the VPN Receiver Device and can be different or the same for different priority level traffic.

At step 821, PSEQs of encapsulating packets corresponding to a priority level and having been stored at queue 610 are identified. Similar to step 813, at step 822, when is the number of a plurality of encapsulating packets having their PSEQ larger than E-PSEQ of the priority level in a period of time is larger than a threshold, it is an indication that the estimation of the E-PSEQ of the identified priority level is not accurate and E-PSEQ of the identified priority level is updated to the largest PSEQ of the most recent encapsulating packet of the identified priority level. E-PSEQ of the priority level is updated to the largest PSEQ among PSEQs of all the encapsulating packets stored at queue 610 and belonging to the priority level at step 823.

Also similar to step 813, the value of the threshold for the number of encapsulating packets having their PSEQ larger than E-PSEQ of the identified priority level in a period of time can be set by an administrator, by the manufacturer of the VPN Receiver Device or estimated by the VPN Receiver Device at step 822. According to one of the embodiments of the present invention, the threshold for the number of encapsulating packets having their PSEQ larger than E-PSEQ of the identified priority level in a period of time is in the range of ten packets to one hundred packets. According to one of the embodiments of the present invention, the predefined threshold for the number of encapsulating packets having their PSEQ larger than E-PSEQ of the identified priority level in a period of time is in the range of three packets to twenty packets for higher priority level traffic.

After an E-PSEQ of a priority level is updated at step 814 or step 823, the process shown in FIG. 8A can be performed again to retrieve and transmit encapsulating packets with their PSEQs that are smaller than or equal to the updated E-PSEQ of the priority level.

FIG. 9, which should also be viewed in conjunction with FIG. 6 and FIG. 8. is a flow-chart illustrating the process of the second method. Step 901 is the same as step 801. At step 902, encapsulating packets stored at elements of queue 610 are examined to determine whether their GSEQs are smaller than or equal to the E-GSEQ. If there is no encapsulating packet with GSEQ that is smaller than or equal to the E-GSEQ, no encapsulating packet is retrieved from queue 601 and transmitted, and the process stops at step 907. On the other hand, if there is one or more encapsulating packets with GSEQ that is smaller than or equal to the E-GSEQ, step 903 is conducted. At step 903, the content of the encapsulating packet is examined to determine whether or not the encapsulating packet is a placeholder put at step 806. If the encapsulating packet is transmitted as indicated by the presence of a placeholder, the placeholder is not transmitted because the corresponding encapsulating packet has been retrieved and transmitted already at step 804. If the encapsulating packet is not a placeholder and is still in the corresponding element of queue 610, the encapsulating packet is transmitted at step 904. At step 905, the element of queue 610 that, is used to hold the encapsulating packet or the placeholder is released to allow the element of queue 610 to be used for other purposes, including storing another encapsulating packet or another placeholder. The E-GSEQ is updated to reflect that expected GSEQ of the next encapsulating packet should be transmitted at step 906. The process stops at step 907.

By using the second method alone, encapsulating packets are transmitted according to the order of GSEQ. Therefore, the encapsulating packets are transmitted in the correct order. If there is an encapsulating packet not able to reach the VPN Receiver Device (Late Encapsulating Packet), the VPN Receiver Device cannot keep waiting for the arrival of the late encapsulating packet or retransmission of the late encapsulating packet as it is possible that the Late Encapsulating Packet will never arrive. Therefore, if there is a plurality of encapsulating packets with GSEQs higher than E-GSEQ arriving at the VPN Receiver Device in a period of time, E-GSEQ is updated to reflect the probability of arrival of Late Encapsulating Packet. If the period of time is too short, encapsulating packets are transmitted without proper ordering. If the predefined period of time is too large, encapsulating packets will experience unnecessary delay before being transmitted.

When an encapsulating packet is transmitted, the packet encapsulated in the data field, such as an IP packet and an Ethernet packet, is first decapsulated and then either transmitted to a host connecting to a network interface of the VPN Receiver Device or be further processed by the VPN Receiver Device. For example, the packet is an encapsulating packet with destination address belonging to one of the network devices connected to the first network interface of the VPN Receiver Device. In another example, the packet encapsulated in the encapsulating packet is a broadcast Ethernet packet that all network devices and computing devices connected to all the interfaces of the VPN Receiver Device will receive it.

According to one of the embodiments of the present invention, the packet encapsulated in the encapsulating packet along with its corresponding GSEQ, TSEQ, PSEQ, and priority are retrieved at step 704. Therefore, it is not the encapsulating packet stored in queue 610; instead, it is the packet, which is originally encapsulated in the encapsulating packet stored in queue 610. Therefore, at steps 801, 804, 901, 902 and 903, it is the packet being stored, processed, retrieved or transmitted. The GSEQ, TSEQ, PSEQ and priority level can be stored in corresponding element of queue 610 along with the packet or can be stored separately but linked with the packet. Those skilled in the art would appreciate different techniques to link the encapsulating packet stored in queue 610 with its corresponding GSEQ, TSEQ, PSEQ, and priority level stored in the same or different parts of a computer readable storage medium.

There are many techniques to identify whether an element in queue 610 is a placeholder or an encapsulating packet. According to one of the embodiments of the present invention, one of the bits in each element in queue is used to indicate whether the element in queue 610 holds a placeholder or an encapsulating packet. According to one of the embodiments of the present invention, a separate memory unit is used to store information about whether an element in queue 610 holds a placeholder or an encapsulating packet. According to one of the embodiments of the present invention, if an element holds a predefined pattern of bits or bytes, the element holds a placeholder. Those skilled in the art would appreciate different techniques to identify whether an element in queue 610 is a placeholder or an encapsulating packet.

According to one of the embodiments of the present invention, the first method shown in FIG. 8 is executed by one thread in a VPN Receiver Device and the second method shown in FIG. 9 is executed by another thread in the VPN Receiver Device. According to one of the embodiments of the present invention, the first method shown in FIG. 8 and the second method shown in FIG. 9 are executed by the same thread.

According to one of the embodiments of the present invention, the first method shown in FIG. 8 is executed by one process in VPN Receiver Device and the second method shown in FIG. 9 is executed by another process in VPN Receiver Device. According to one of the embodiments of the present invention, the first method shown in FIG. 8 and the second method shown in FIG. 9 are executed by the same process.

According to one of the embodiments of the present invention, the execution of the first method shown in FIG. 8 is in sequence with the execution of the second method shown in FIG. 9. According to one of the embodiments of the present invention, the execution of the first method shown in FIG. 8 does not need to be in sequence with the execution of the second method shown in FIG. 9.

According to one of the embodiments of the present invention, if any part of the encapsulating packet is encrypted, the encrypted part is decrypted to retrieve the packet.

VPN Sender Device

An embodiment of the VPN Sender Device will be described with reference to FIG. 1, FIG. 4 and FIG. 10. In FIG. 1, network device 103 and 105 can both act as a VPN Sender Device. Since the VPN Sender Device, in the case of a reverse direction of the data flow, can assume the function of VPN Sender Device, the following also applies to the network device 103 and 105; said network device 103 and 105 can furthermore be of identical design.

VPN Sender Device 1001 shown has been implemented in the form of a hardware router. It comprises a housing in which a circuit board 1004 with processing unit 1002 and computer readable storage medium 1003 are disposed. The above-described methods according to the present invention are implemented on the circuit board 1004 in the form of software. The circuit board 1004 connects to communication modules 1005 in the housing. The communication modules 1005 can be designed for identical or different network access links, such as network access links 121*a*, 121*b*, and 121*c*. For example, a communication module 1005 can be designed for an Ethernet network access link while another communication module 1005 can be designed for a LTE network access link and still another communication module can be designed for a WLAN network access link. Communication modules 1005 can be part of circuit board 1004, can be connected to circuit board 1004 through bus architecture, such as PCI and USB, can be inserted into circuit board 1004 or can be connected to circuit hoard through a communication port.

Computer readable storage medium 1003 is capable of storing, containing or carrying instruction(s) for processing unit 1002 to perform and/or data for processing unit 1002 to use.

The communication modules 1005 comprise suitable connector means 1006, for example, in the form of socket connectors, a LAN socket connector, a PCI bus connector, a USB connector, a Thunderbolt connector or an Ethernet connector for connection with an associated network access link.

According to one of the embodiments of the present invention, a packet, which is to be transmitted via one of the logical network connections in one of the, network access links to one of computing device 101*a*, 101*b* or 101*c*, reaches network device 105 (acting as a VPN Sender Device in this embodiment) through network access link 121*c* via the LAN socket connector 1006 and communication module 1005, is then transmitted to circuit board 1004. Circuit board 1004 determines which priority level the packet belongs to. Circuit board 1004 determines the priority level according to the port number of the packet, the content of the packet, the type of service field in the packet, and/or other common packet inspection techniques known by those skilled in the art. Circuit board 1004 then stores the packet in a priority queue, such as 401, 402 and 403, corresponding to the determined priority level at computer readable storage medium 1003. According to one of the embodiments of the present invention, at this point, circuit board 1004 determines the GSEQ, TSEQ, PSEQ and priority level of the packet. In one variant, circuit board 1004 does not determine TSEQ at this point, but rather determines TSEQ when the packet is about to be transmitted.

A plurality of logical network connections are established in network access links 121*a* and 121*b* by circuit board 1004 of network device 105 to connect to network device 103 (acting as a VPN Receiver Device in this embodiment).

When circuit board 1004 determines that it is able to transmit a packet to network device 103, circuit board 1004 retrieves a packet which has the lowest PSEQ in the priority queue from the one of the priority queues at the computer readable storage medium 1003. According to one of the embodiments of the present invention, circuit board 1004 first tries to retrieve a packet with lowest PSEQ from priority queue 401. If there is no packet in priority queue 401, the network device 105 then tries to retrieve a packet with lowest PSEQ from priority queue 402. If there is also no packet in priority queue 402, circuit board 1004 then tries to retrieve a packet with lowest PSEQ from priority queue 403.

Circuit board 1004 selects the logical network connection in the network access link to transmit the packet retrieved. The decision to select which of the of the logical network connections in network access links to be used depends on policies, which are stored in computer readable storage medium 1003, configurable by the administrator of network device 105, policies determined by the manufacturer of network device 105, or a combination of both.

Circuit board 1004 assigns a TSEQ according to the logical network connection selected. GSEQ, TSEQ, PSEQ, the priority level determined and the packet retrieved are combined by circuit board 1004 together to form data payload of an encapsulating packet, which is then transmitted to network device 103 via one of the logical network connections in one of the network access links and the corresponding communication module 1005. In one variant, circuit board 1004 encapsulates GSEQ, TSEQ, PSEQ, the priority level determined and the packet retrieved in the encapsulating packet.

Circuit board 1004 decides which logical network connection should be used for transmitting the encapsulating packet, such as logical network connections 421, 431 and 432, based on policies, which are stored at computer readable storage medium 1003, configurable by the administrator of the network device 103 or policies determined by the manufacturer of the network device 103.

According to one of the embodiments of the present invention, circuit board 1004 is ready to transmit an encapsulating packet when circuit board 1004 has enough processing power, a predefined period of time is reached, the network access link is ready, a logical network connection is ready, there is enough buffer at the logical network connection and/or other reasons to allow circuit board 1004 to transmit the encapsulating packet that are commonly known to those skilled in the arts.

According to one of the embodiments of the present invention, only the payload of an, encapsulating packet is encrypted by circuit board 1004. Additionally or alternatively, at least one of the priority level, global sequence number and priority sequence number stored at the options field of the encapsulating packet is encrypted by circuit board 1004. Circuit board 1004 uses processing unit 1002 to carry out encryption and decryption. In one variant, there is a separate encryption and decryption processing unit to carry out encryption and decryption in order to lower the loading on processing unit 1002.

VPN Receiver Device

VPN Receiver Device can be identical in design to the VPN Sender Device. Therefore, the embodiment shown in FIG. 10 also applies for a VPN Receiver Device. In FIG. 10, when viewed in conjunction with FIG. 1 and FIG. 6, illustrates one of the embodiments of a VPN Receiver Device of the present invention.

VPN Receiver Device shown has been implemented in the form of a hardware router. It comprises a housing in which circuit boards 1004 with processing unit 1002 and computer readable storage medium 1003 are disposed. The above-described methods according to the present invention are implemented on circuit board 1004 in the form of software. Circuit board 1004 connects to communication modules 1005 in housing 8. The communication modules 1005 can be designed for identical or different network access links, such as network access links 120*a*, 120*b*, and 120*c*, and network link 120*d*. For example, a communication module 1005 can be designed for an Ethernet network access link while another communication module 1005 can be designed for a LTE network access link and still another communication module can be designed for a WLAN network access link. Communication modules 1005 can be part of circuit board 1004, can be connected to circuit board 1004 through bus architecture, such as PCI and USB, can be inserted into circuit board 1004 or can be connected to circuit board through a communication port.

Computer readable storage medium 1003 is capable of storing, containing or carrying instruction(s) for processing unit 1002 to perform and/or data for processing unit 1002 to use.

The communication modules 1005 comprise suitable connector means, for example, in the form of socket connectors, a LAN socket connector, a PCI bus connector, a USB connector, a Thunderbolt connector or an Ethernet connector for connection with an associated network access link.

According to one of embodiments of the present invention, a plurality of logical network connections are established in access links 120a, 120b and 120c by circuit board 1004 of network device 103 (acting as a VPN Receiver Device in this embodiment) to connect to network device 105 (acting as a VPN Sender Device in this embodiment).

When an encapsulating packet reaches a network device 103 the via one of logical network connections in one of the network access links and socket connector 1006, the encapsulating packet is transmitted to circuit board 1004 via communication module 1005 for processing.

Circuit board 1004 identifies GSEQ, PSEQ, TSEQ and priority level of the encapsulating packet by examining the other options fields of the encapsulating packet. Processing unit 1002 then determines whether to store the encapsulating packet in one of the elements of queue 610 in computer readable storage medium 1003. The packet encapsulated in encapsulating packet, such as an IP packet or Ethernet packet, is retrieved by processing unit 1002 and transmitted if processing unit 1002 determines not to store the encapsulating packet.

Processing unit 1002 updates E-GSEQ and E-PSEQ and stores E-GSEQ and E-PSEQ at computer readable storage medium 1003. Processing unit 1002 also compares GSEQ and PSEQ of the encapsulating packet with E-GSEQ and E-PSEQ to determine whether to store the encapsulating packet in queue 610 and whether to retrieve an encapsulating packet from queue 610 for transmission. Computer readable storage medium 1003 stores queue 610.

When the GSEQ is larger than the E-GSEQ but the PSEQ is smaller or equal to the E-PSEQ of the corresponding priority level, the encapsulating packet is not stored in queue 610. Instead, processing unit 1002 stores a placeholder in one of the elements of queue 610 at and the encapsulating packet is transmitted via a communication module 1005 and socket connector 1006 to the receiving host.

According to one of the embodiments of the present invention, if any part of the encapsulating packet is encrypted, the encrypted part is decrypted by processing unit 1002 or a decryption circuit on circuit board 1004 to retrieve the original packet.

There are many techniques for processing unit 1002 to identify whether an element in queue 610 is a placeholder or an encapsulating packet. According to one of the embodiments of the present invention, one of the bits in each element in queue 610 is used to indicate whether the element in queue 610 holds a placeholder. According to one of the embodiments of the present invention, a separate memory unit in computer readable storage medium 1003 is used to store information about whether or not an element in queue 610 holds a placeholder. According to one of the embodiments of the present invention, if an element holds a predefined pattern of bits or bytes, processing unit 1002 determines that the element holds a placeholder. Those skilled in the art would appreciate different techniques to have instructions to instruct processing units how to identify whether an element in queue 610 is a placeholder.

The above-described methods according, to the present invention are implemented on the circuit board 1004 in the form of software for the VPN Receiver Device.

The method implemented on the circuit board 1004 can also be implemented directly at a circuit board or a software layer for a PC, server, and cloud enabled server or the like. If it is a software layer, the method according to the present invention is then implemented as a software layer on the PC, server, and cloud enabled server or the like.

BRIEF DESCRIPTION OF DRAWINGS

For a more complete understanding of the present invention, reference is now made to the following descriptions taken in conjunction with the accompanying drawing, in which:

FIG. 1 is a network diagram illustrating the use of network devices via a plurality of logical network connections according to one of the embodiments of the present invention in a typical network environment.

FIG. 2 is a diagram showing one example of a packet format according to usual IPv4;

FIG. 3 is a diagram illustrating option fields and data fields of an encapsulating packet according to one of the embodiments of the present invention in a typical network environment;

FIG. 4 is a diagram illustrating the relationship among priority queue, logical network connections, and network access links at a VPN Sender Device according to one of the embodiments of the present invention;

FIG. 5A is a flow-chart illustrating the steps of determining priority level according to one of the embodiments of the present invention;

FIG. 5B is a flow-chart illustrating the steps of transmitting an encapsulating packet according to one of the embodiments of the present invention;

FIG. 6 is a diagram illustrating the relationship among a plurality of logical network connections, network access links and a queue at a VPN Receiver Device according to one of the embodiments of the present invention;

FIG. 7 is a flow-chart illustrating the steps of receiving an encapsulating packet according to one of the embodiments of the present invention;

FIG. 8A is a flow-chart illustrating the steps of retrieving an encapsulating packet from a queue according to one of the embodiments of the present invention;

FIG. 8B is a flow-chart illustrating the steps of a process to update E-PSEQ according to one of the embodiments of the present invention;

FIG. 8C is a flow-chart illustrating the steps of another process to update E-PSEQ according to one of the embodiments of the present invention;

FIG. 9 is a flow-chart illustrating the steps of a process to transmit a packet according to one of the embodiments of the present invention; and FIG. 10 is a network device according to one of the embodiments of the present invention.

The invention claimed is:

1. A method for transmitting and receiving packets at a first network device, wherein the first network device comprises a plurality of network interfaces, comprising the steps of:

(a) establishing a plurality of logical network connections with a second network device, wherein each logical network connections comprises a plurality of network links, and wherein the plurality of logical network connections are aggregated to form an aggregated logical network connection;
(b) receiving a first packet through one of the plurality of network interfaces;
(c) determining whether the first packet has been received through a logical network connection or from a host connected through a local area network (LAN) connection, wherein when the packet has been received through a logical network connection, the first packet is an encapsulating packet;
(d) if the first packet has been received through a logical network connection:
  (i) identifying priority level of a packet encapsulated in the first packet;
  (ii) determining whether or not to store the first packet in queue based on priority level, global sequence number (GSEQ), priority sequence number (PSEQ) and logical network connection sequence number (TSEQ) of the packet encapsulated in the first packet;
  (iii) storing the first packet in the queue if the GSEQ is larger than an expected GSEQ (E-GSEQ)
  (iv) when the GSEQ is larger than the E-GSEQ but the PSEQ is smaller or equal to an expected PSEQ (E-PSEQ), and when the first packet has a high priority level, not storing the first packet in the queue, decapsulating the packet from the first packet, transmitting the packet, and storing a placeholder in the queue; wherein transmitting the packet is performed through a LAN connection;
  (v) updating the E-PSEQ and E-GSEQ after the packet has been transmitted;
(e) if the first packet has been received through a LAN connection, is from a highest available priority queue and has a lowest PSEQ:
  (i) retrieving the first packet from a first priority queue; wherein the first priority queue is the highest available priority queue;
  (ii) selecting a first logical network connection to use for transmitting the first packet;
  (iii) assigning a TSEQ to the first packet according to the first logical network connection determined to be used;
  (iv) creating payload of a second packet, wherein payload of the second packet encapsulates the first packet, and GSEQ, TSEQ, PSEQ, and priority level of the first packet;
  (v) transmitting the second packet through the first logical network connection determined to be used.

2. The method of claim 1, if the first packet cannot be transmitted via the first logical network connection selected in step (e)(i) due to network error, retransmitting the first packet though the first logical network connection, or another second logical network connection.

3. The method of claim 2, wherein when retransmitting the first packet through the second logical network connection, TSEQ is different, and GSEQ and PSEQ remain the same, wherein the first logical network connection and the second logical network connection is selected based on policies configured by a network administrator.

4. The method of claim 3, wherein the policies are chosen from a group of policies consisting of latency policy, bandwidth policy, pricing policy, delay policy, packet drop policy, usage policy, and number of sessions allowed policy.

5. The method of claim 1, wherein step (e)(i) is performed when the network device has enough processing power, a predefined storage time for the first packet is reached, a network access link is ready, a logical network connection is ready, and/or there is enough buffer at the logical network connection.

6. The method of claim 1, wherein at least one of the priority level, GSEQ, PSEQ, TSEQ, and the packet encapsulated in the first packet of step (d)(ii) is encrypted.

7. The method of claim 1, wherein the E-GSEQ indicates the expected global sequence number of a packet to be arrived, and wherein the E-PSEQ indicates the expected priority sequence number of a packet to be arrived.

8. The method of claim 1, further comprising, before step (d)(iv), determining whether the first packet is a placeholder; and not transmitting the first packet if the first packet is determined to be a placeholder.

9. The method of claim 1, further comprising, after step (d)(iii), updating the E-PSEQ if the number of encapsulating packets stored in the queue with PSEQ larger than E-PSEQ is larger than a threshold.

10. The method of claim 1, wherein the first priority queue selected in step (e)(i) is a priority queue with the largest number of packets, a priority queue which has a packet having been stored for the longest time, a priority queue with the largest number of packets, or a priority queue selected according to an equation or a policy.

11. A first network device for transmitting and receiving packets, comprising:
a plurality of network interfaces;
at least one processing unit configured to deliver instructions to perform basic arithmetical, logical, and input/output operations of the network device;
at least one non-transitory computer readable storage medium storing program instructions executable by the at least one processing unit for:
(a) establishing a plurality of logical network connections with a second network device, wherein each logical network connections comprises a plurality of network links, and wherein the plurality of logical network connections are aggregated to form an aggregated logical network connection;
(b) receiving a first packet through one of the plurality of network interfaces;
(c) determining whether the first packet has been received through a logical network connection or from a host connected through a local area network (LAN) connection, wherein when the packet has been received through a logical network connection, the first packet is an encapsulating packet;
(d) if the first packet has been received through a logical network connection:
  (i) identifying priority level of a packet encapsulated in the first packet;
  (ii) determining whether or not to store the first packet in queue based on priority level, global sequence number (GSEQ), priority sequence number (PSEQ) and logical network connection sequence number (TSEQ) of the packet encapsulated in the first packet;
  (iii) storing the first packet in the queue if the GSEQ is larger than an expected GSEQ (E-GSEQ);
  (iv) when the GSEQ is larger than the E-GSEQ but the PSEQ is smaller or equal to an expected PSEQ (E-PSEQ), and when the first packet has a high priority level, not storing the first packet in the queue, decapsulating the packet from the first packet, transmitting the packet, and storing a placeholder in the queue; wherein transmitting the packet is performed through a LAN connection;
  (v) updating the E-PSEQ and E-GSEQ after the packet has been transmitted;
(e) if the first packet has been received through a LAN connection, is from a highest available priority queue and has a lowest PSEQ:
  (i) retrieving the first packet from a first priority queue; wherein the first priority queue is the highest available priority queue;
  (ii) selecting a first logical network connection to use for transmitting the first packet;
  (iii) assigning a TSEQ to the first packet according to the first logical network connection determined to be used;
  (iv) creating payload of a second packet, wherein payload of the second packet encapsulates the first packet, and GSEQ, TSEQ, PSEQ, and priority level of the first packet;
  (v) transmitting the second packet through the first logical network connection determined to be used.

12. The first network device of claim 11, wherein if the first packet cannot be transmitted via the first logical network connection selected in step (e)(i) due to network error, retransmitting the first packet though the first logical network connection, or another second logical network connection.

13. The first network device of claim 12, wherein when retransmitting the first packet through the second logical network connection, TSEQ is different, and GSEQ and PSEQ remain the same, wherein the first logical network connection and the second logical network connection is selected based on policies configured by a network administrator.

14. The first network device of claim 13, wherein the policies are chosen from a group of policies consisting of latency policy, bandwidth policy, pricing policy, delay policy, packet drop policy, usage policy, and number of sessions allowed policy.

15. The first network device of claim 11, wherein step (e)(i) is performed when the network device has enough processing power, a predefined storage time for the first packet is reached, a network access link is ready, a logical network connection is ready, and/or there is enough buffer at the logical network connection.

16. The first network device of claim 11, wherein at least one of the priority level, GSEQ, PSEQ, TSEQ, and the packet encapsulated in the first packet of step (d)(ii) is encrypted.

17. The first network device of claim 11, wherein the E-GSEQ indicates the expected global sequence number of a packet to be arrived, and wherein the E-PSEQ indicates the expected priority sequence number of a packet to be arrived.

18. The first network device of claim 11, further comprising, before step (d)(iv), determining whether the first packet is a placeholder; and not transmitting the first packet if the first packet is determined to be a placeholder.

19. The first network device of claim 11, further comprising, after step (d)(iii), updating the E-PSEQ if the number of encapsulating packets stored in the queue with PSEQ larger than E-PSEQ is larger than a threshold.

20. The first network device of claim 11, wherein the first priority queue selected in step (e)(i) is a priority queue with the largest number of packets, a priority queue which has a packet having been stored for the longest time, a priority queue with the largest number of packets, or a priority queue selected according to an equation or a policy.

* * * * *